Patented Oct. 5, 1954

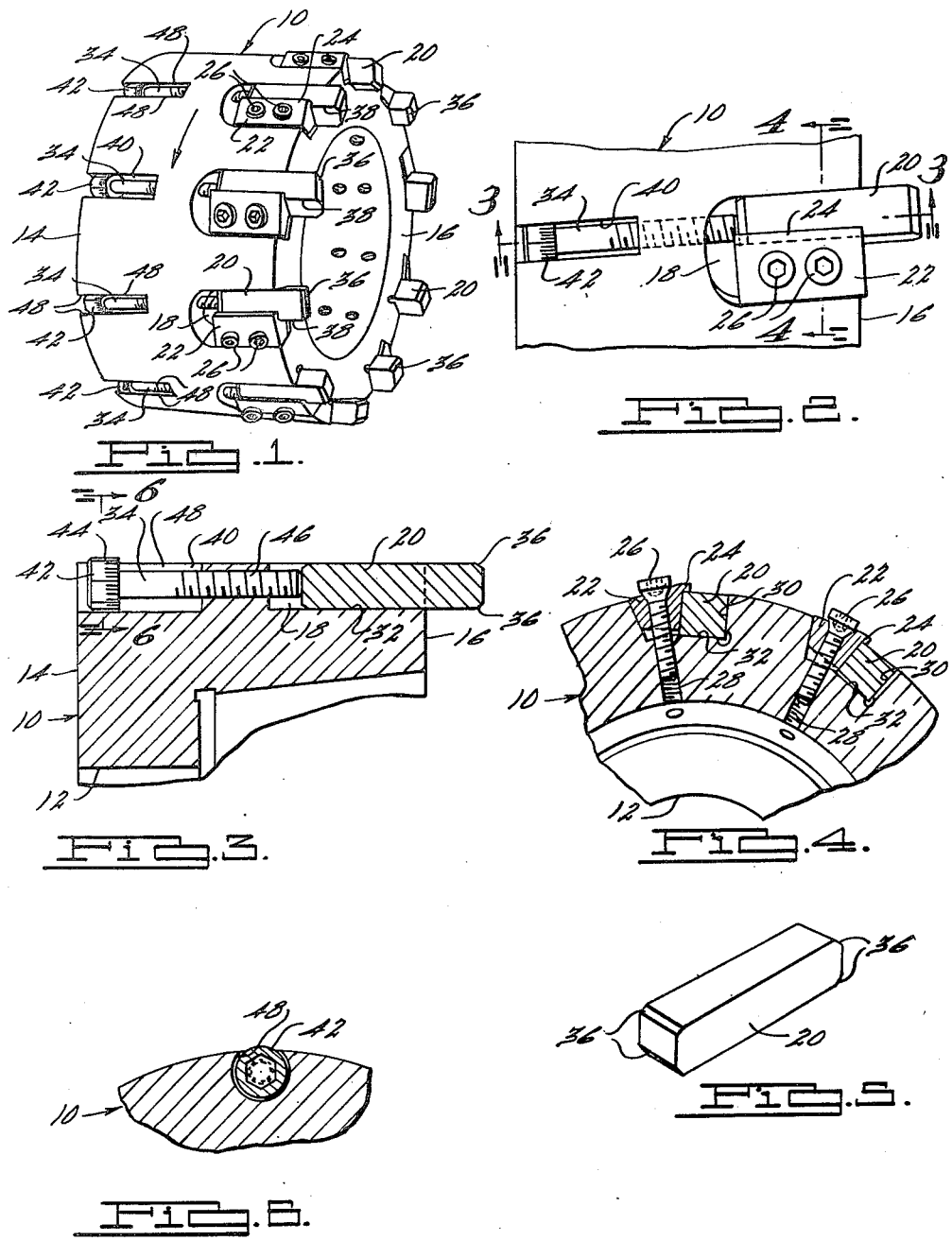

2,690,610

UNITED STATES PATENT OFFICE 2,690,610

MILLING CUTTER

Howell E. Begle and Gedeon Frederic Gaudreau, Detroit, Mich.; said Gaudreau assignor to said Begle Application June 27, 1949, Serial No. 101,642

4 Claims. (Cl. 29—105)

This invention relates to new and useful improvements in milling cutters.

Tungsten carbide multiple-tooth milling cutters are widely used since they permit high feed rates. Typical examples of such cutters are shown in the patents to Ebert No. 1,165,859, to Runde, 1,376,972, Hulse (Fr.) 579,991, Loewe (Ger.) 649,852, Urban (Ger.) 674,112, Metzger 1,650,290, Gleason 2,126,004, and Seiter 2,382,509. In each of these milling cutters, however, the individual teeth have to be sharpened periodically. To sharpen these cutters it is necessary to adjust all of the blades so that they project equidistantly, radially, and axially from the cutter body, then grind off the worn portions of the blades and then grind primary and secondary clearance angles on each blade while mounted in the cutter body. Close tolerances are required, and labor and wheel costs are high, particularly where each production run requires a new grind. Further, the efficiency of the cutter and consequently the duration of the production run obtained before resharpening depends considerably on the skill of the operator.

An important object of the present invention is to provide a uniform and superior grind on each of the plurality of cutting edges so that the length and quality of production runs with the cutter will be equally superior and uniform.

Another object of the present invention is to provide a face milling cutter in which the cutting blades are uniquely shaped and are mounted on the cutter head in such manner that individual grinding of the cutter blades for clearance angles is entirely eliminated.

Still another object of the invention is to provide a face milling cutter in which the cutter blades are so shaped that proper clearance angles are obtained automatically when the blades are mounted on the cutter head.

Yet another object of the invention is to provide a face milling cutter in which the unique shape of the cutter blades and the manner in which the blades are mounted on the cutter head permit a relatively large number of blades to be mounted on the head.

A further object of the invention is to provide a face milling cutter which, by reason of the large number of blades, is capable of performing heavier or more difficult machining operations than heretofore without danger of overloading the blades.

A still further object of the invention is to provide a face milling cutter that can be used considerably longer than heretofore before sharpening of the blades is necessary.

A yet further object of the invention is to provide a face milling cutter in which each cutting blade has a plurality of cutting edges that can be brought successively into operative position on the head merely by indexing or changing the position of the blade on the head.

Another object of the invention is to provide a face milling cutter having novel means for adjusting the blades on the head so as to assure exactly uniform positioning of the blades.

Other objects and advantages of the invention will be apparent during the course of the following description.

In the drawings forming a part of this specification and wherein like numerals are employed to designate like parts throughout the same:

Fig. 1 is a perspective view of a face milling cutter embodying the invention;

Fig. 2 is a fragmentary, side elevational view thereof;

Fig. 3 is a fragmentary, radial, sectional view taken on the line 3—3 of Fig. 2;

Fig. 4 is a fragmentary, transverse, sectional view taken on the line 4—4 of Fig. 2;

Fig. 5 is a perspective view of a cutting blade forming a part of the invention;

Fig. 6 is a fragmentary, sectional view taken on lines 6—6 of Fig. 3;

Figure 7:
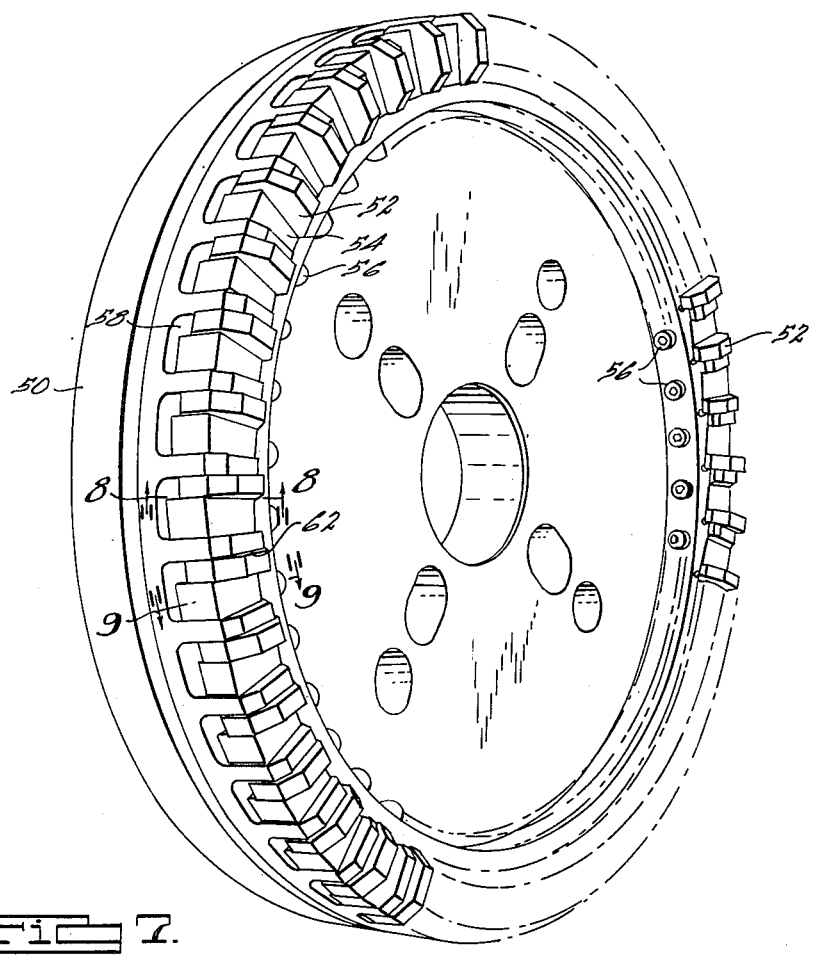
Fig. 7 is a perspective view showing a modified cutter head embodying the invention.

In the drawings, attention is first directed to the form of the invention shown in Figs. 1–6 wherein the numeral 10 designates a cutter head. The head 10 here shown is generally disk-shaped and has the usual center bore 12 for attachment to the spindle of a face mill. The rear face 14 of the head 10 is carefully machined to be exactly flat and to be precisely at right angles to the axis of the head according to conventional practice so that the head will fit snugly against the face plate of the spindle.

At circumferentially spaced points around the periphery of the head 10 and intersecting the front face 16 thereof are recesses 18 which receive cutting blades 20. The blades 20 are made of a suitably hard metal such as tungsten carbide, and the individual blades are held solidly in their respective recesses 18 by clamping blocks 22.

As perhaps best shown in Fig. 4, clamping blocks 22 are wedged into the recesses 18 beside cutter blades 20, and each block has a laterally projecting lip 24 which overlies the adjacent outer marginal edge of the cutter blade. The overhanging lip portions 24 are forced against the blades 20 by screws 26 which extend through the clamping blocks 22 and are screwed into internally threaded holes 28 provided in the head 10. Also, it will be observed (Fig. 4) that the sides of clamping blocks 22 remote from the cutter blades 20 and the confronting sides of recesses 18 are inwardly tapered so that the clamping blocks are wedged or forced sideways solidly against the cutter blades when the screws 26 are tightened. The lateral clamping action thus exerted against the cutter blades 20 by blocks 22, as well as the positive holding action of the clamping lips 24, holds the cutter blades fixedly associated with the head 10 and in flat pressed engagement with the radial and circumferential surfaces 30 and 32 respectively of the recesses 18. The cutter is adapted to rotate in the direction of the arrow in Fig. 1 so that the surfaces 30 constitute driving faces for the blades 20.

Adjusting or back-up screws 34 carried by the head 10, as shown in Figs. 1 and 3, engage the rearward or inner end surfaces of the cutter blades 20 to position the same axially in the recesses 18. Screws 34 can be adjusted when clamping blocks 22 are loose to position cutting blades 20 axially in recesses 18. In this connection it will be observed that the blades 20 project beyond the face 16 of the head 10 and, as suggested, it is desirable that all of the blades extend exactly the same distances beyond the face 16 so that each blade will do an equal share of the total work performed by the cutter.

The particular shape of the cutter blade 20 is a feature of this invention. Considered broadly, the blade 20 should be uniform in size and shape throughout its length and the shape should be such as to provide a plurality of cutting edges. More specifically, the blade may assume the shape in transverse section of any symmetrical polyhedron, i. e., it may be triangular, rectangular, octagonal, etc. In actual practice, however, it has been found that in a cutter of the type here under consideration, rectangular blades are most desirable for all types of metal. Triangular blades are comparatively weak due to the relatively small angle between the adjacent sides of the cutting edge. On the other hand, in cutter blades having more than four sides the cutting edges are too blunt for many purposes due to the relatively great included angle between the adjacent sides which define the cutting edges. Cutter blades which are rectangular in transverse section have adequate strength and are suitable for milling operation on all types of ferrous metals. In the case of relatively small cutters of the types shown in the drawings, the cutting blades 12 preferably are square in transverse section; however, in larger cutters it may be desirable to make the cutter blades oblong or rectangular in order to secure the advantage of the greater strength afforded by this shape. For the purpose of this invention, however, both shapes are considered to be rectangular. Opposite edges at the ends of the cutter blades 20 are chamfered, as at 36, to provide bilaterally symmetrical halves, and the blades are mounted in the head 10 with the chamfered edges generally parallel to the periphery of the head. When the cutter blades 20 are mounted in this manner, the outside leading edges 38 thereof are the cutting edges. The chamfered surface 36 adjacent the edge 38 strengthens the blade in use and prevents the working or cutting corner of the blade from breaking down rapidly in use.

The particular shape of cutter blade here shown has the advantage that each blade has four separate cutting edges which may be brought successively into operative position on the head before grinding or sharpening of the blade is necessary. Thus, if it is assumed that blades of the type shown in Fig. 5 are mounted on the head 10 as shown in Fig. 1, the edge designated by the numeral 38 constitutes one cutting edge of the blade. When this edge 38 becomes so badly chewed or worn as to render the cutter inoperative or inefficient in use, a fresh, sharp cutting edge can be brought into use merely by indexing or turning the blade 180° about its longitudinal axis. This brings the diametrically opposite edge of the blade into operative or cutting position on the head 10. When the second edge becomes worn, the cutting blade may be turned end for end, and in this latter position it has two additional cutting edges ready for use. Thus, after the cutter blade has been turned end for end, it is mounted on the head with one edge 38 in operative cutting position; and after this edge has become worn, the blade is again turned 180° about its longitudinal axis to bring the fourth cutting edge into use. Since the length of the blade is not altered by use or by repositioning it in the head and since the blade is uniform throughout its length in cross-sectional size and shape, no adjustment need be made when the blade is indexed, other than loosening the clamping block 22 which holds it clamped to the head. Important savings in time and effort and consequently in production costs are achieved by making it possible to use four different cutting edges of the blades 20 without the necessity of grinding or otherwise sharpening the blades.

Another advantage to using cutting blades of the particular shape here shown is that the blades can be resharpened merely by grinding off the chewed or worn terminal portions and chamfering opposite edges of the ground end surfaces. Further, since it is merely necessary to grind the ends of the blades 20 at right angles to the longitudinal axes thereof, the grinding operation is exceedingly simple and a large number of the blades can be ground simultaneously and semi-automatically in the machines of known construction. The fact that it is not necessary to grind each cutter blade individually to provide the several necessary clearance angles greatly facilitates the entire operation.

As suggested, another important feature of the invention resides in the manner in which the cutter blades 20 are supported and positioned by the body 10 so as to provide the necessary clearance angles without necessity of grinding the clearances on the individual cutter blades. Since each cutter blade 20 is supported by two surfaces 30 and 32, it is possible to grind these surfaces into the body 10 so that they support the cutting blades at the desired angles. The particular clearance provided for the cutter blades will vary, depending upon the particular use for which the cutter is adapted. In the particular cutter here shown, each cutter blade 20 is given a negative 3° axial rake angle, a negative 6° radial rake angle, and a 0° corner angle. The radial surfaces 30 determine the axial and radial rake angles and the rear or peripheral surfaces 32 determine the corner angles of the cutter blades 20. Manifestly, the surfaces 30 and 32 will support all cutter blades that are similar in size and shape identically on the head 10. Thus, when one blade 20 is substituted for another, the second blade will be positioned on the head identically to the first blade and both blades will have exactly the same clearance angles. Also, it will be readily apparent that the individual cutter blade 20 will have exactly the same clearance angles in each of the four positions on the cutter head. By grinding the clearance angles on the cutter body instead of on the cutter blade, the necessity of grinding the individual blade every time sharpening is required has been entirely eliminated. Stated differently, the present invention utilizes a combination of angles that can be ground into the cutter body so as to permit the use of plain shapes having a multiplicity of cutting edges as the cutter blades with the result that regrinding costs are tremendously reduced and simplified. In other words, in the cutter here shown by way of illustration, the surface 30 is ground into the cutter body so as to hold the cutter blade 20 which it supports at a negative 3° axial rake angle and a negative 6° radial rake angle and the surface 32 is ground into the cutter body so as to hold the cutter blade at a 0° corner angle.

With respect to the means for adjusting cutter blades 20 axially on the head 10, it will be observed that the adjusting screws 34 are arranged parallel to the periphery of the head 10 and that the head portions of the screws are disposed in recesses 40 (Fig. 3). The screw heads 42 are calibrated circumferentially, as at 44, and the calibrations are correlated with the lead of the screw threads 46. Thus, the axial advancement or retraction of adjusting screws 34 can be read directly from the calibrations 44. In practice, either of the edges 48 of recess 40 may be used as a reference mark for the calibrations 44.

When adjusting the cutter blades 20 they may be set either from the front face 16 or the rear face 14 of the cutter head 10; however, the rear face 14 preferably is used as this face of the cutter usually is machined more accurately than the front face 16. The distance the cutter blades 20 are to project beyond the face 16 of the cutter head 10 is first determined, and the cutter blades are mounted on the head so as to project approximately the desired distance. Any suitable or conventional gauge can be used to indicate the actual distance between the distal or working edge of each cutter blade 20 and the rear face 14 of the cutter head 10. The adjusting screws 34 are then actuated to adjust the cutter blades 20 to the desired position. Manifestly the amount of adjustment necessary to accurately position the cutter blades 20 can be read directly from the calibrations 42 in the manner described. After each blade 20 is adjusted, screws 26 are tightened to force the clamping block 22 which holds it in place solidly thereagainst.

In connection with the foregoing, it will be readily apparent that adjusting screws 34 need not be disturbed when the cutter blades are repositioned on the head in the manner hereinabove described. Since the blades 20 are not worn away axially in use, they will automatically assume properly adjusted positions when they are repositioned on the head to bring a fresh cutting edge into operative position. As it is not necessary to readjust each blade 20 when it is repositioned on the head 10, the changes can be made in a few minutes and the cutter is out of use for only a short time.

Figures 8, 9:
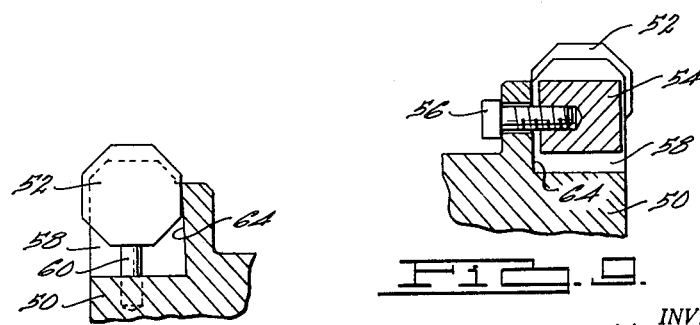
Fig. 8 is a fragmentary, radial, sectional view taken on the line 8—8 of Fig. 7.
Fig. 9 is a fragmentary, radial sectional view taken on the line 9—9 of Fig. 7.

Reference is now had to the form of the invention shown in Figs. 7-9 which embodies a generally disk-shaped cutter head 50 and a plurality of cutting blades 52 which are arranged in substantially equispaced relation around the periphery of the head and are fastened solidly but removably to the head by clamping blocks 54 secured to the head by screws 56. Each individual cutting blade 52 and its associated clamping block 54 is mounted in a peripheral recess 58 which is formed in the head 50, and all of the cutting blades seat rearwardly against locating pins 60 which position the blades so that they project equidistantly axially or forwardly from the head. The side walls 62 of the recesses 58 are carefully ground to position the cutting blades 52 at the desired axial and radial rake angles, and the rear walls 64 of the recesses are carefully machined exactly at right angles to the walls 62 and exactly concentrically with respect to the axis of the cutter head 50 so that all the cutting blades 52 project precisely the same distance radially of the cutter head.

From the foregoing it will be readily apparent that the form of the invention here under consideration embodies the same fundamental concepts as the form of the invention first described. All the cutting blades 52 are in the form of regular polyhedrons. As a result, they can be formed relatively inexpensively, and the necessity for grinding complicated clearance angles on the individual blades has been entirely eliminated. The blades 52 are automatically positioned properly on the cutter head 50 with the cutting edges thereof at the desired angles.

The particular blades 52 here shown by way of illustration are octagonal in form so that each blade has eight cutting edges at each end or side thereof or a total of sixteen cutting edges in all. After the cutting blades 52 have become dulled by use, it is necessary merely to loosen the clamping screws 56 and to turn or index the blades 45° to bring a fresh, sharp, cutting edge into operative position. After the cutting blades 52 have been indexed eight times in this manner, they can be turned end for end and the entire process repeated for the additional cutting edges thus provided. It is contemplated that the cutting blades 52 be thrown away or discarded after all the sixteen cutting edges have been used; and if this is done, the necessity of grinding or adjusting the blades is entirely eliminated. This can be done economically in the present instance because of the small size of the cutting blades and because of the large number of operations that may be obtained from each blade without regrinding.

The advantages of the instant milling cutter over conventional milling cutters of this type will be readily apparent to those skilled in the art. Heretofore, it has been customary to mount cutting blades either radially or axially in the cutter body and to grind the necessary clearance angles on each individual blade. To our knowledge this has been universal practice. Proper clearance and relief angles are essential in order to assure low power consumption, sustained production runs, and good chip disposal. After every production run the cutting blades are dulled and it is necessary to take the milling cutter body off the milling machine and to send it to the cutter-grind department for servicing. In the cutter-grind department all of the cutting blades are removed from the cutter body and any broken or chipped blades are replaced. The cutting blades are then remounted in the cutter body and adjusted so that all of the blades extend radially and axially to the proper dimension. After adjustment of the cutting blades, the cutter is mounted on a grinding machine and the various necessary rake relief, and clearance angles are ground on the individual blades. Manifestly, this is a time-consuming and costly procedure. Further, if the cutting blades are of tungsten carbide according to conventional practice, the grinding operation requires the use of diamond wheels which are exceedingly expensive.

To the best of our knowledge we are the first to conceive the idea of using cutting blades of regular polygonal form and of grinding the necessary clearance, relief and rake angles on the cutter body itself so as to eliminate the necessity of grinding each individual cutting blade after each production run.

Our first design embodying the above principle is disclosed in our copending application Serial No. 18,414 which was filed on the first day of April 1948. This construction represents a decided improvement over prior art cutters, but it is not suited for certain types of high production operations. In this prior design we use triangular cutting blades that are positioned by the supporting walls of the cutter body to provide the necessary rake, relief, and clearance angles, and the cutting blades can be indexed to bring successive cutting edges into operation position on the body. Thus, a multiplicity of runs can be obtained before resharpening is necessary. However, as suggested, this cutter was not suitable for high production, cast-iron milling with feed rates of forty to fifty inches per minute. The particular shape of the cutting blades and the manner in which they are mounted on the body do not permit a sufficient number of blades to be mounted on the body to meet these conditions. Further, the particular shape of the cutting blades and the manner in which they are mounted on the body has made it impossible to mill up against a shoulder on the work.

Both forms of the instant invention here shown by way of illustration are primarily adapted and pre-eminently suited for use on jobs requiring high production speed rates, and both of these cutters can be used to mill all the way up against a shoulder on the work if necessary or desirable. Both forms of the invention here shown utilize the same combination of double-negative rake angles used on the cutter forming the subject matter of our prior application hereinabove referred to. In the form of the invention first shown (Figs. 1-6), the cutting blades are mounted in the body so as to have a negative three-degree axial rake angle and a negative six-degree radial rake angle, and in the second form of the invention the cutting blades preferably are mounted in the body so as to have a negative three-degree axial rake angle and a negative ten-degree radial rake angle. However, it will be readily apparent to those skilled in the art that considerable variation in these angles are possible, and it may be necessary to vary these angles somewhat according to the exigencies of the particular situation. In every instance, however, both the axial angle and the radial rake angle must be negative in order to provide clearances for the cutting edges.

It may thus be seen that we have achieved the objects of our invention. We have provided a milling cutter in which the cutting blades are uniquely shaped and are mounted on the cutter head in such manner that individual grinding of the cutting blades for clearance angles is entirely eliminated. By reason of the particular shape of the cutting blades and the manner in which they are mounted on the head, the cutter can be used at higher production rates than have heretofore been possible. These advantages are achieved, firstly, by incorporating all of the necessary angles into the cutter body instead of on the individual cutter blades; secondly, by designing the blades with a plurality of cutting edges and mounting them on the cutter body in such manner that they can be indexed to bring the cutting edges progressively into operative position on the head; thirdly, by providing means for accurately locating the blades so that each blade is identically positioned on the body and will perform an equal share of the work; and fourthly, by providing proper wedges for holding the blades securely on the body.

Having thus described the invention, we claim:

1. A milling cutter comprising a generally disk-shaped rotatable cutter body; a plurality of essentially thin indexable cutter blades extending edgewise into the body at the juncture of the periphery and one side thereof, said blades being of hard wear-resistant composition and having opposite parallel sides and a plurality of edge surfaces arranged generally in the form of a polygon, each edge surface being identical in size and shape to the other of said edge surfaces, said edge surfaces disposed at right angles to said side surfaces and each of said edge surfaces having an essentially sharp cutting edge at the junction thereof with each of said side surfaces; two fixed locating surfaces on the cutter body engaging and seating respective edge surfaces of each blade, corresponding locating surfaces being identically positioned axially and radially on the body, said locating surfaces being jointly operative to position the blades identically radially and axially on the body and with respect to the axis thereof; back-up surfaces fixed with respect to the body each operating with respect to one side of a respective cutter blade, said back-up surfaces tilted away from the direction of rotation of the cutter body about axes extending both parallel and at right angles to the axis of the body and providing fixed positioning means for the blades supported thereby to automatically determine the necessary peripheral and face-clearance angles in all indexed positions of the blades.

2. A milling cutter comprising a generally disk-shaped rotatable cutter body; a plurality of essentially thin indexable cutter blades extending edgewise into the body at the juncture of the periphery and one side thereof, said blades being of essentially hard, wear-resistant composition and having opposite parallel sides and a plurality of edge surfaces arranged generally in the form of an octagon, each edge surface being identical in size and shape to the other of said edge surfaces, said edge surfaces disposed at right angles to said side surfaces and each of said edge surfaces having an essentially sharp cutting edge at the juncture thereof with each of said side surfaces, fixed locating pins solidly embedded in and projecting from the body and disposed below and engaging one edge surface of the cutter blades, the projecting portions of the pins having finished surfaces which seat the cutter blades and position such blades so that they all project equidistantly from the mentioned side of the body; formed surfaces behind and engaging still another edge surface of the cutter blades positioning the latter so that they project equidistantly from the periphery of the body; integral back-up surfaces on the cutter body each engaging flatly against one side of a respective cutter blade, each back-up surface being tilted away from the direction of rotation of the cutter body about axes extending both parallel and at right angles to the axis of the body so as to position the blades supported thereby with necessary peripheral and face-clearance angles in the indexed positions thereof; and clamps secured to the body holding the blades solidly against said back-up surfaces.

3. In a milling cutter, a generally disk-shaped rotatable cutter body, said body having a plurality of formed seats adjacent the periphery and one side thereof, each seat having a cutter blade back-up surface tilted away from the direction of rotation of the cutter body about axes extending both parallel and at right angles to the axis of the body, a radially outwardly facing formed surface laterally of said back-up surface for positioning the cutter blade radially in said seat, and a locating pin laterally of the back-up surface and at right angles to said formed surface engageable with a cutter blade in said seat to position the blade axially in the body.

4. In a milling cutter, a generally disk-shaped rotatable cutter body, said body having a plurality of formed seats at the periphery and one side thereof, each seat having a cutter blade back-up surface tilted away from the direction of rotation of the cutter body about axes extending both parallel and at right angles to the axis of the body, a radially outwardly facing formed surface laterally of said back-up surface for positioning the cutter blade radially in said seat, and a second formed surface disposed angularly with respect to said radially outwardly facing formed surface and laterally of said back-up surface engageable with a cutter blade in said seat to position the blade axially in the body.

References Cited in the file of this patent

UNITED STATES PATENTS

| Number | Name | Date |
|---|---|---|
| 161,835 | Squire | Apr. 6, 1875 |
| 1,165,859 | Ebert | Dec. 28, 1915 |
| 1,376,972 | Runde | May 3, 1921 |
| 1,449,513 | Jaeger | Mar. 27, 1923 |
| 1,460,029 | Mattson | June 26, 1923 |
| 1,460,030 | Mattson | June 26, 1923 |
| 1,650,290 | Metzger | Nov. 22, 1927 |
| 1,860,275 | Chapin | May 24, 1932 |
| 1,887,372 | Emmons | Nov. 8, 1932 |
| 1,973,428 | Comstock | Sept. 11, 1934 |
| 2,126,004 | Gleason | Aug. 9, 1938 |
| 2,309,372 | Wissler | Jan. 26, 1943 |
| 2,341,314 | Clark | Feb. 8, 1944 |
| 2,370,273 | Ulliman | Feb. 27, 1945 |
| 2,382,509 | Seiter | Aug. 14, 1945 |
| 2,420,057 | Steffes | May 6, 1947 |

FOREIGN PATENTS

| Number | Country | Date |
|---|---|---|
| 579,991 | France | Aug. 19, 1924 |
| 649,852 | Germany | Sept. 4, 1937 |
| 674,112 | Germany | Apr. 5, 1939 |

OTHER REFERENCES

Kennametal Catalogue, May 1949, pages 58–60.